United States Patent
Bui et al.

(10) Patent No.: US 8,861,324 B1
(45) Date of Patent: Oct. 14, 2014

(54) DAMAGED TAPE CARTRIDGE DETECTION

(71) Applicant: International Business Machines Corporation, Armonk, NY (US)

(72) Inventors: Nhan X. Bui, Tucson, AZ (US); Ernest S. Gale, Tucson, AZ (US); Reed A. Hancock, Tucson, AZ (US); Randy C. Inch, Tucson, AZ (US); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/929,047

(22) Filed: Jun. 27, 2013

(51) Int. Cl.
*G11B 20/18* (2006.01)

(52) U.S. Cl.
USPC ..................... 369/53.42; 369/53.41

(58) Field of Classification Search
None
See application file for complete search history.

(56) References Cited

U.S. PATENT DOCUMENTS

| | | | |
|---|---|---|---|
| 6,172,834 B1 | 1/2001 | Newton | |
| 2002/0167746 A1 | 11/2002 | Burke et al. | |
| 2003/0214745 A1 | 11/2003 | Lau | |
| 2009/0201609 A1 | 8/2009 | Argumedo et al. | |
| 2009/0316553 A1* | 12/2009 | Monk et al. | 369/53.41 |

FOREIGN PATENT DOCUMENTS

| | | |
|---|---|---|
| EP | 0 982 721 A2 | 3/2000 |
| JP | 2000/067560 A | 3/2000 |
| JP | 2000/348406 A | 12/2000 |

OTHER PUBLICATIONS

Bhushan, B., "Chapter 6: Long Term Reliability of Magnetic Tapes," Springer-Verlag New York, Inc., 2000, Mechanics and Reliability of Flexible Magnetic Media, pp. 419-504.
Petrek et al., "Study of durability and lateral tape motion of magnetic tape data storage media under high-speed operating conditions using magnetic and edge probe methods," Springer-Verlag 2008, Microsyst Technol, vol. 14, pp. 841-853.

* cited by examiner

*Primary Examiner* — Paul Huber
(74) *Attorney, Agent, or Firm* — Zilka-Kotab, PC

(57) ABSTRACT

A system, according to one embodiment, includes a tape drive configured to detect a telescoping condition of a magnetic recording tape and output an error alert when the telescoping condition is detected. Furthermore, a method, according to another embodiment, includes detecting a telescoping condition of a magnetic recording tape in use in a tape drive, and outputting an error alert when the telescoping condition is detected.

20 Claims, 3 Drawing Sheets

DAMAGED TAPE CARTRIDGE DETECTION

BACKGROUND

The present invention relates to data storage systems, and more particularly, this invention relates to detecting conditions persistent with damaged tape cartridges and recovering data stored therein before the data becomes unreadable.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." An example of a data storage cartridge that is widely employed in automated data storage libraries for mass data storage is a magnetic tape cartridge having a magnetic recording tape therein.

Data is read from and written onto the magnetic recording tape utilizing magnetic transducers. Data is written on the magnetic recording tape by moving a magnetic recording transducer to a position over the tape where the data is to be stored. The magnetic recording transducer then generates a magnetic field, which encodes the data into the magnetic tape. Data is read from the tape by similarly positioning the magnetic read transducer and then sensing the magnetic field of the magnetic tape. Read and write operations may be independently synchronized with the movement of the tape to ensure that the data can be read from and written to the desired location on the tape.

An important and continuing goal in the data storage industry is that of increasing reliability, capacity and performance. For tape storage systems, that goal has led to increasing the amount of tape stored in a cartridge, reducing the thickness of the tape, and increasing the operating speeds. However, such development has created various problems with respect to tape cartridges for use in such systems.

BRIEF SUMMARY

A system according to one embodiment includes a tape drive configured to detect a telescoping condition of a magnetic recording tape and output an error alert when the telescoping condition is detected.

A method according to one embodiment includes detecting a telescoping condition of a magnetic recording tape in use in a tape drive, and outputting an error alert when the telescoping condition is detected.

A method according to another embodiment includes receiving an error alert indicating that a telescoping condition of a magnetic recording tape is detected, and implementing an error recovery procedure in response to receiving the error alert.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic tape cartridges, as well as operation and/or component parts thereof. Various embodiments described herein preferably provide designs for detecting telescoping conditions of tape before they progress to the point of causing the tape reels to become irreversibly stuck within a cartridge. Thus, loss of data written to the tape stored on such reels may be prevented, as will be discussed in further detail below.

In one general embodiment, a system includes a tape drive configured to detect a telescoping condition of a magnetic recording tape and output an error alert when the telescoping condition is detected.

In another general embodiment, a method includes detecting a telescoping condition of a magnetic recording tape in use in a tape drive, and outputting an error alert when the telescoping condition is detected.

In yet another general embodiment, a method includes receiving an error alert indicating that a telescoping condition of a magnetic recording tape is detected, and implementing an error recovery procedure in response to receiving the error alert.

Figure 1A:
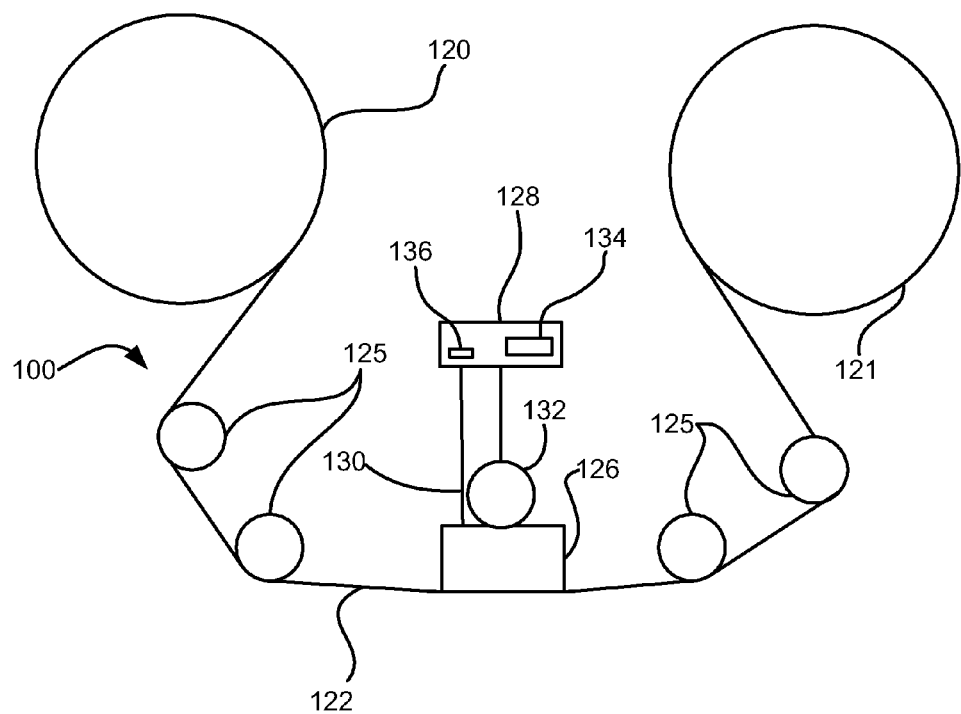
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128 may be, or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
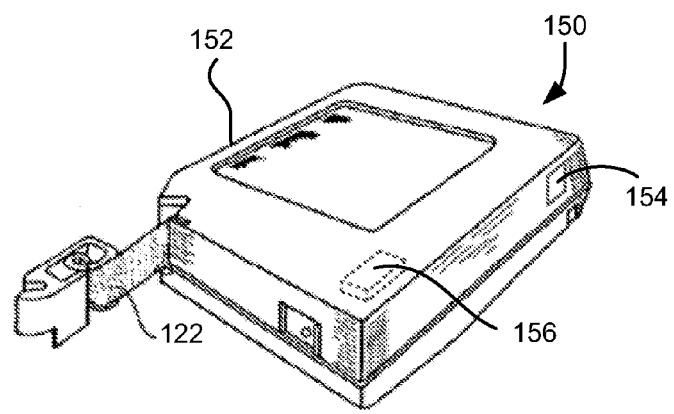
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

The tape cartridge 150 may also include a tape reel around which the tape 122 is wrapped.

Figure 2:
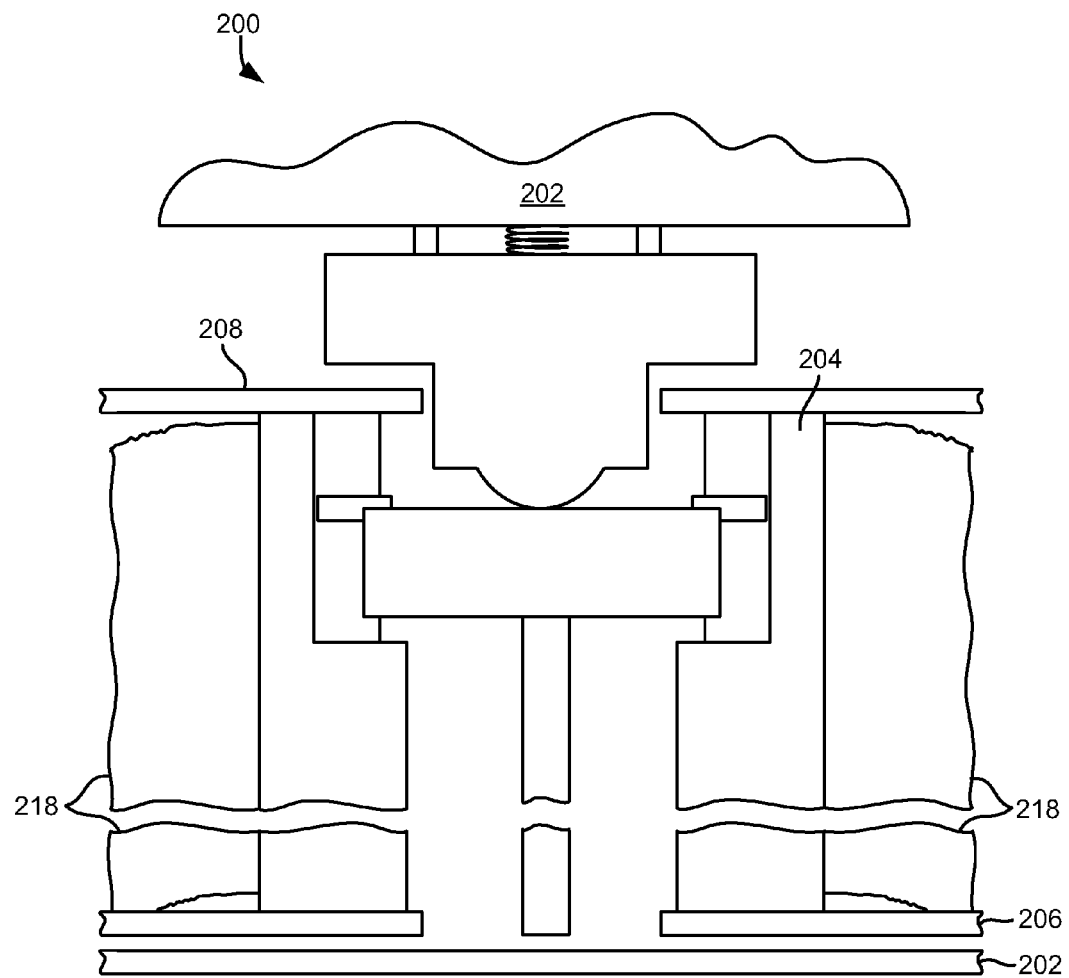
FIG. 2 is a partial cross-sectional view of a tape cartridge according to one embodiment.

FIG. 2 depicts a partial cross-sectional view of a tape cartridge 200, in accordance with one embodiment. As an option, the present tape cartridge 200 may be implemented in conjunction with features from any other embodiment listed herein, such as those described with reference to the other FIGS. Of course, however, such tape cartridge 200 and others presented herein may be used in various applications and/or in permutations which may or may not be specifically described in the illustrative embodiments listed herein. Further, the tape cartridge 200 presented herein may be used in any desired environment. Thus FIG. 2 (and the other FIGS.) should be deemed to include any and all possible permutations.

Referring now to FIG. 2, the tape cartridge 200 includes a housing 202 which may be any housing known in the art. The tape cartridge 200 also includes a reel 204, adapted to store a magnetic recording tape thereon, e.g., the reel 204 is preferably rotatable relative to the housing 202. Thus, according to one approach, a magnetic recording tape 218 is wrapped around the reel 204.

Moreover, the reel 204 has flanges 206, 208 which are intended to keep the tape 218 from drifting off the side of the reel 204 when being wrapped thereon. The flanges 206, 208 tend to keep the tape 218 oriented towards a nominally centered position on the reel 204. However, during use of the cartridge and tape stored therein, e.g., reading data from and/or writing data to the tape, the top or bottom edge of a magnetic tape may become stressed and/or stretched compared to the center and/or other edge of the magnetic tape on the reel.

As a result of such stress and/or stretching, the tape tends to slide away from the stressed edge, and thus closer to one of the flanges 206, 208 of the reel 204. This drifting is typically very small, e.g., on the order of a few microns, and thereby may not have an adverse effect on the magnetic tape and/or cartridge. However, as the stress and/or stretching of that tape increases, and the fact that there may be up to about 4,000 wraps of tape on the reel 204 that allow those few microns to add up, the amount of drifting towards one of the flanges increases as well, thereby causing "telescoping" of the tape wound on the reel 204.

Such telescoping may also be caused by other sources. For example, telescoping is sometimes the result of poor cutting quality when manufacturing the tapes, thereby creating damaged (e.g. rough) edges of the tape. Damaged or improperly aligned tape guides may also cause telescoping.

As illustrated in FIG. 2, telescoping of the tape 218 may cause the tape 218 to shift enough that it comes into contact with one of the reel flanges 206. If the telescoping of the tape 218 is severe enough, the tape 218 may exert enough force on the reel flange 206 to deflect the flange into the surrounding stationary parts of the cartridge housing 202 and/or the drive mechanism. Given that there is often a limited clearance between the flanges 206, 208 of the rotating reel 204 and other parts of the cartridge housing 202 and/or tape drive mechanism, telescoping of the tape 218 can result in unwanted contact between the respective moving and stationary parts.

If such contact is left undetected and allowed to progress, the magnitude of the telescoping can grow to the point that the contact induced thereby causes such high friction between the flange and the cartridge and/or tape drive, that the rotating reel can become stuck, thereby preventing the tape from being wound from the reel and/or rewound back onto the reel in the cartridge. In the past, such conditions occurred infrequently, mostly in tandem with abnormal perverse tape motion commands. However, as magnetic tapes become thinner, these conditions have become more common, even without abnormal tape motion.

It follows that it may be desirable to detect a telescoping condition of a tape pack in a cartridge at an early stage. Various embodiments described herein preferably provide procedures and systems for detecting telescoping conditions of tape before they progress to the point that the tape reel becomes irreversibly stuck within a cartridge. Thus, loss of data written to the tape stored on such reels may be prevented, as will be discussed in further detail below.

Figure 3:
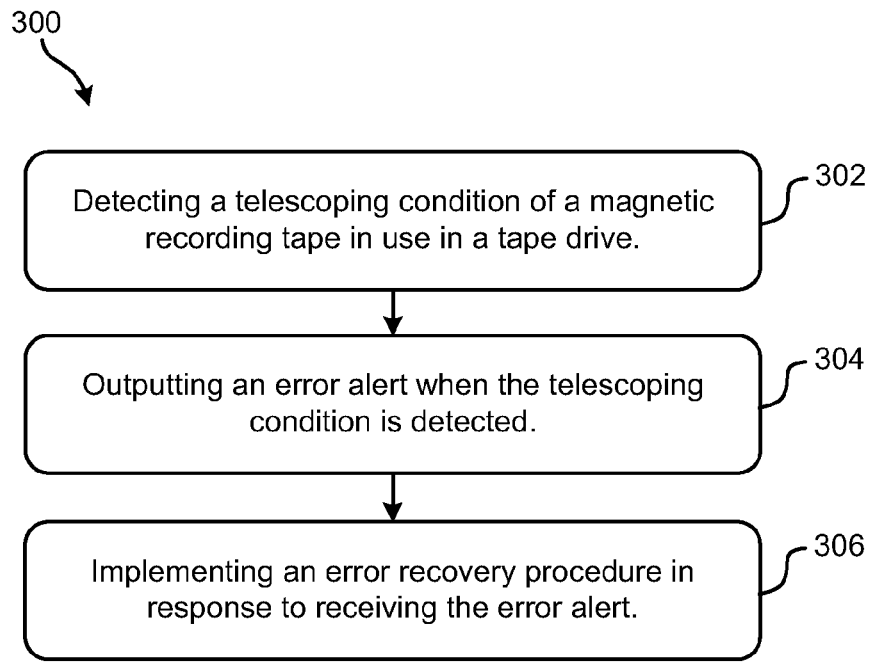
FIG. 3 is a flow chart of a method according to one embodiment.

FIG. 3 depicts a method 300 for detecting a telescoping condition of a magnetic recording tape, in accordance with one embodiment. As an option, the present method 300 may be implemented in conjunction with features from any other embodiment listed herein, such as those described with reference to the other FIGS. Of course, however, such method 300 and others presented herein may be used in various applications and/or in permutations which may or may not be specifically described in the illustrative embodiments listed herein. Further, the method 300 presented herein may be used in any desired environment. Thus FIG. 3 (and the other FIGS.) should be deemed to include any and all possible permutations.

Referring now to FIG. 3, the method 300 includes detecting a telescoping condition of a magnetic recording tape in use in a tape drive, such as of magnetic recording tape 218 of FIG. 2 which is in the cartridge housing 202. See operation 302 of FIG. 3. According to various approaches, a telescoping condition may be detected using a number of different techniques as will soon become apparent.

Moreover, operation 304 of the method 300 further includes outputting an error alert when the telescoping condition is detected. In various approaches, the error alert may include an error code sent to a machine such as a library controller, storage area network controller, etc.; an audible sound, e.g., a beep, chime, continuous tone, etc.; a visual stimuli, e.g., a flashing light source, a colored indicator, a flag, etc.; a notification, e.g., an email sent to a user, a text box on a user interface, etc.; etc.

The method 300 of FIG. 3 may be performed by a tape drive, or at a system level e.g., by a tape library controller, virtual tape library (VTL) system controller, storage area network (SAN) controller, etc., where the tape library, VTL, SAN, etc. may be of a type known in the art but further configured to perform functions as set forth herein.

Moreover, once a telescoping condition is detected for a given magnetic tape, an error recovery procedure may be implemented, e.g., to prevent loss of data stored on the tape, as will be discussed in further detail below. See also operation 306 of FIG. 3.

With continued reference to the method 300 of FIG. 3, as mentioned above, the telescoping condition may be detected using a number of different techniques. In preferred embodiments, tape cartridge conditions may be monitored by various devices, e.g., sensors, preferably during use thereof, to detect the onset of a telescoping condition. According to one example, which is in no way intended to limit the invention, the operation of a tape drive may be monitored by a controller using, e.g., microcode, one or more servos, a control loop, (e.g., see 128 of FIG. 1A), etc. During operation, the tape drive may receive tape cartridges and perform read and/or write operations to the tape stored in the cartridges. However, as described above, it is desirable to detect a telescoping condition of a tape in a cartridge at an early stage. Thus, the control system may be programmed to recognize certain anomalies congruent with initial stages of such telescoping conditions, as will soon become apparent.

As the tape on a reel telescopes to the point that one of the reel's flanges begins to contact a portion of the cartridge, the area of the flange that comes into contact is usually confined to a high point on the flange. This may be in part due to the flanges of the reel being not perfectly flat, e.g., the space separating either of the flanges from the cartridge is not conformal across each of the respective flanges. Additionally, a telescoping tape may apply an unequal force along a flange, thereby causing some portion of the flange to deflect farther towards the cartridge than other portions of the same flange.

As a result, the contact(s) formed between high point(s) on the flange and the portion of the cartridge are reproduced with each revolution of the reel, e.g., each time the high points on the flange and the portion of the cartridge align. Thus, the frequency at which the contact occurs may be about the same as the frequency at which the reel is rotating. This frequency can be used to detect the telescoping condition.

According to one embodiment, the telescoping condition of a tape may be detected based at least in part on correlation of a cartridge reel rotation frequency, to a term and/or signal being monitored to detect the telescoping condition. In various approaches, the term and/or signal being monitored may include a friction term, an integrator term, a velocity error signal, an audible signal, and/or a motor current applied to a motor of the tape drive. Each of these is discussed in turn below.

Moreover, threshold values may be set for each of the terms and/or signals, above (or equivalently below) which it may be assumed that a telescoping condition for a given tape has occurred. According to different approaches, threshold values may be defined by a user, a predetermined value, values in a lookup table, computations, etc. Furthermore, thresholds may depend on operating conditions and may change over time for a given cartridge, e.g., depending on age, amount of reads and/or writes, size, importance of data stored therein, etc.

As described above, telescoping of the tape may deflect one of the reel flanges into the surrounding stationary parts of the cartridge shell and/or the drive mechanism itself. Thus, the additional friction caused as one of the reel flanges contacts the cartridge and/or the drive mechanism may indicate a telescoping condition.

According to an exemplary embodiment, the microcode and/or servo of a tape drive may be used to calculate the friction for a tape being read from and/or written to. According to one approach, the friction may be determined by averaging the velocity error signal over time and calculating a friction term that is mitigated with a friction current component to the reel motor control algorithms. As mentioned above, the friction term is typically about constant for normal operation when there is no telescoping, and varies little from cartridge to cartridge and/or for different tape position. However, during contact between the reel flange and the cartridge, the friction value increases noticeably.

According to one example, a control system may monitor the friction associated with normal operation of a non-telescoped tape, e.g., to sustain a constant velocity of the tape over a head (e.g., see 126 of FIG. 1A) during writing of data thereto and/or reading of data thereon. By sustaining a constant velocity of tape, e.g., maintaining a low velocity error signal, the number of read and/or write errors experienced is desirably reduced, thereby optimizing performance. Friction values during normal operation of a non-telescoped tape remain about constant over periods of time. However, as one of the reel flanges begins to contact the cartridge, the operating friction may spike momentarily during each revolution of the tape reel, between which the friction of the system may return to the previous value (e.g., as it would be during normal operation). As this cycle continues, the control system may recognize the periodic spikes in friction as an indication of a telescoping condition, due to its synchronization with the reel rotational frequency.

Furthermore, when the friction of the system peaks during contact between the reel flange and the cartridge, the added resistance may be compensated for, such that the tape maintains about a constant velocity over the tape head. In various approaches, this compensation may be indicated by increased values of an integrator term, velocity error signal and/or a motor current applied to a motor of the tape drive. Thus, any of these terms may be monitored for detecting a telescoping condition.

According to some approaches, the friction value may not be part of a control loop, e.g., it may be calculated, monitored and/or controlled separately. Therefore, in different approaches, an increase in friction may be detected by using a heat sensor, e.g., temperature gauge, infrared sensor, etc.; or any other device which would be apparent to one skilled in the art upon reading the present description. However, in other approaches, the friction may be calculated using the tape velocity, motor current, tape reel rotational frequency, etc., as a part of a control loop.

According to one approach, an integrator term may compensate for increases to the velocity error signal caused by contact between one of the reel flanges and the cartridge. In an exemplary approach, a system may include a proportional integrator and derivative (PID) loop, e.g., in conjunction with a control system. The PID loop may increase an integrator term as the velocity error value increases, to ensure about constant velocity of the tape relative to the head.

Thus, a control system may recognize the periodic spikes in the value of an integrator term as an indication of a telescoping condition, due to its synchronization with the reel rotational frequency. Similarly, the periodic spikes in the value of a velocity error signal may serve as an indication of a telescoping condition in some embodiments.

According to another approach, the motor current applied to a motor of the tape drive may be used to compensate for contact made between one of the reel flanges and the cartridge. As described above, the contact between the flange and the cartridge results in an increased resistance, thereby causing a momentary decrease in tape velocity (signified e.g., by an increased velocity error signal). However, during the time of contact, the current supplied to the motor controlling the tape velocity may be increased, thereby increasing the motor output and tape velocity. Moreover, as the tape reel rotates, in the time between points of contact, the current supplied to the motor may be reduced to its previous value (e.g., during normal operation), thereby maintaining a constant tape velocity.

In yet another approach, the telescoping condition may be detected based at least in part on an audible signal. As a telescoping condition progresses, at least one of the reel flanges begins to rub against the tape cartridge, thereby creating an audible signal, e.g., a scraping sound. In one approach, a microphone and/or a similar device may be positioned in, on and/or in a vicinity of the tape drive to sense such audible signals, and thereby detect the telescoping condition. In another approach, an accelerometer may be positioned in, on and/or in a vicinity of the tape drive to sense vibrations caused by the contact between the tape flange and the cartridge and/or tape drive, to detect the onset of a telescoping condition.

On some occasions, the nature of the contact induced by the telescoping condition may be continual rather than at some frequency, e.g., the contact between the flange and the cartridge is sustained for the full rotation of the reel. The drag and/or noise induced thereby may be used to detect the telescoping condition.

When the contact between the flange and the cartridge is of a continual nature, e.g., the contact may be sustained for the full rotation of the reel for a period of time. Thus, in some embodiments, the telescoping condition may be detected when the value any of the terms and/or signals described above suddenly deviates from a typical or average range of values expected and/or observed during normal operation, and this altered value is sustained for the full, continual rotation of the reel for a period of time.

Once a telescoping condition is detected for a given tape cartridge using any of the approaches described above, and/or combinations thereof, an action may be taken to prevent further telescoping and/or to avoid data loss.

Figure 4:
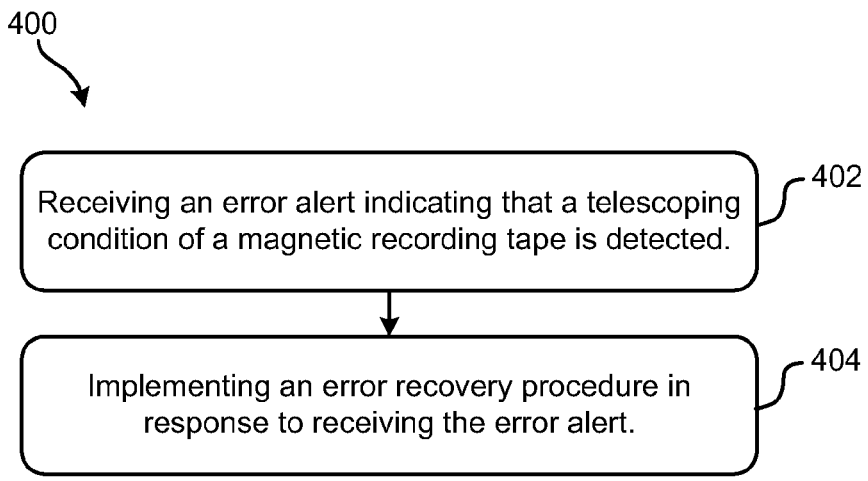
FIG. 4 is a flow chart of a method according to one embodiment.

FIG. 4 depicts a method 400 for preventing loss of data stored in cartridges having a telescoping condition, in accordance with one embodiment. As an option, the present method 400 may be implemented in conjunction with features from any other embodiment listed herein, such as those described with reference to the other FIGS. Of course, however, such method 400 and others presented herein may be used in various applications and/or in permutations which may or may not be specifically described in the illustrative embodiments listed herein. Further, the method 400 presented herein may be used in any desired environment. Thus FIG. 4 (and the other FIGS.) should be deemed to include any and all possible permutations.

Referring now to FIG. 4, the method 400 includes receiving an error alert indicating that a telescoping condition of a magnetic recording tape is detected. See operation 402. Moreover, the operation 404 of method 400 includes implementing an error recovery procedure in response to receiving the error alert.

It should also be noted that method 400 may be performed by a tape drive, or at a system level e.g., by a tape library controller, VTL system controller, SAN controller, etc., where the tape library, VTL, SAN, etc. may be of a type known in the art but further configured to perform functions as set forth herein.

With continued reference to FIG. 4, according to one approach, the error recovery procedure may simply include identifying the magnetic recording tape as having a problem. This identification may be stored in system-level and/or cartridge memory of a type known in the art using, for instance, a lookup table, flag, code, etc. Accordingly, each of the potentially multiple tape cartridges of a given system may have data pertaining to their status stored in memory located on the respective cartridges (e.g., see 156 of FIG. 1B), in a drive, in a controller, etc.

In a further approach, the error recovery procedure may include preventing writing to the magnetic recording tape having the telescoping condition, thereby effectively making the magnetic recording tape a read only tape, and preferably a read-once-only tape. According to one example, the identification of a magnetic recording tape may determine if its status is that of a read only tape, or if writing thereto is permitted. This preferably prevents additional data from being written to the tape of a questionable cartridge, thereby minimizing the amount of potential data loss.

Any data stored on the tape in the cartridge is preferably recovered, e.g., to prevent loss thereof. According to one approach, the error recovery procedure may include reading data from the magnetic recording tape having the telescoping condition, at a lower tension than a default tension value, e.g., the tension value that would normally be used by the drive with the magnetic recording tape in the absence of the error alert. By lowering the tension value of the tape, the force of the tape against one of the flanges of the tape reel may be diminished, thereby potentially reducing the effects of the telescoping condition.

In one example, a reduced tape tension may be achieved by unwinding the tape from the cartridge having the telescoping condition onto a temporary reel, and then winding the tape back onto the reel of the same or different cartridge, at a lower tension than before. In another example, the tape having the telescoping condition may be unwound from a cartridge and simultaneously wound onto the reel of another tape cartridge at a lower tension than before. Thus, in one approach, the error recovery procedure may include inducing a tape refresh operation. It follows that although a refresh operation may be performed, it is preferred that monitoring for any telescoping condition of the magnetic recording tape is maintained during the refresh and/or subsequent operation, but is not required.

With continued reference to FIG. 4, the error recovery procedure of operation 404 may include reading data from the magnetic recording tape into a cache for transient, temporary, and/or long term storage. Moreover, the data stored in the cache may then be written onto a different magnetic tape cartridge. Thus, in one approach, the error recovery procedure may include rewriting data stored on the magnetic recording tape of the tape cartridge to a second magnetic recording tape, e.g., of another tape cartridge.

According to another embodiment, if the data stored on a tape having a telescoping condition is a second (e.g., duplicate) copy of a primary copy, the cartridge and/or tape having a telescoping condition may simply be discarded. Moreover, the primary copy of data may be used to write a third copy of the data, e.g., to replace the discarded second copy. According to various approaches, the primary copy and/or second copy may be stored on magnetic tape, magnetic disk, in memory, etc.

According to another example, data stored on a magnetic disk may be written to magnetic tape of a first cartridge, e.g., to create a backup copy of the data stored on the disk. However, while writing the data from the disk to the tape, the system may detect a telescoping condition of tape in the first cartridge. Thus, the writing of data to the tape would be stopped and the first cartridge, having the telescoping condition, would be removed from the system, undergo a pack refresh, discarded, etc., depending on the desired embodiment. Moreover, a second cartridge may then be used to rewrite the data, that was to be backed up on the first cartridge, from the magnetic disk to the second cartridge.

Furthermore, according to different embodiments, a braking component may include any of the approaches described and/or suggested herein, or combinations thereof, depending on the desired embodiment.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising a tape drive, the tape drive being configured to:
    detect a telescoping condition of a magnetic recording tape on a tape reel, wherein the telescoping condition corresponds to a flange of the tape reel contacting a stationary part; and
    output an error alert when the telescoping condition is detected.

2. A system as recited in claim 1, wherein the telescoping condition is detected based at least in part on a friction term.

3. A system as recited in claim 1, wherein the telescoping condition is detected based at least in part on an integrator term.

4. A system as recited in claim 1, wherein the telescoping condition is detected based at least in part on a velocity error signal.

5. A system as recited in claim 1, wherein the telescoping condition is detected based at least in part on a motor current applied to a motor of the tape drive.

6. A system as recited in claim 1, wherein the telescoping condition is detected based at least in part on an audible signal.

7. A method, comprising:
    detecting a telescoping condition of a magnetic recording tape in use in a tape drive, wherein the telescoping condition corresponds to a flange of a tape reel contacting a stationary part; and
    outputting an error alert when the telescoping condition is detected.

8. A method as recited in claim 7, wherein the telescoping condition is detected based at least in part on a friction term.

9. A method as recited in claim 7, wherein the telescoping condition is detected based at least in part on an integrator term.

10. A method as recited in claim 7, wherein the telescoping condition is detected based at least in part on a velocity error signal.

11. A method as recited in claim 7, wherein the telescoping condition is detected based at least in part on a motor current applied to a motor of the tape drive.

12. A method as recited in claim 7, wherein the telescoping condition is detected based at least in part on an audible signal.

13. A method as recited in claim 7, wherein the telescoping condition is detected based at least in part on correlation of a reel rotation frequency to a term and/or signal being monitored to detect the telescoping condition.

14. A method, comprising:
    receiving an error alert indicating that a telescoping condition of a magnetic recording tape is detected, wherein the error recovery procedure includes at least one of: reading data from the magnetic recording tape at a lower tension than a default tension value, and reading data from the magnetic recording tape into a cache; and
    implementing an error recovery procedure in response to receiving the error alert.

15. A method as recited in claim 14, wherein the error recovery procedure includes preventing writing to the magnetic recording tape.

16. A method as recited in claim 14, wherein the error recovery procedure includes the reading data from the magnetic recording tape at a lower tension than a default tension value.

17. A method as recited in claim 14, wherein the error recovery procedure includes inducing a tape refresh operation.

18. A method as recited in claim 14, wherein the error recovery procedure includes rewriting data written to the magnetic recording tape to a second magnetic recording tape.

19. A method as recited in claim 14, wherein the error recovery procedure includes the reading data from the magnetic recording tape into a cache.

20. A method as recited in claim 14, wherein the error recovery procedure includes identifying the magnetic recording tape as having a problem.

* * * * *